(12) United States Patent
Yan et al.

(10) Patent No.: US 11,822,083 B2
(45) Date of Patent: Nov. 21, 2023

(54) DISPLAY SYSTEM WITH TIME INTERLEAVING

(71) Applicant: Apple Inc., Cupertino, CA (US)

(72) Inventors: Jin Yan, San Jose, CA (US); Xiaokai Li, Mountain View, CA (US); Young Cheol Yang, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/935,080

(22) Filed: Jul. 21, 2020

(65) Prior Publication Data

US 2021/0048673 A1 Feb. 18, 2021

Related U.S. Application Data

(60) Provisional application No. 62/886,171, filed on Aug. 13, 2019.

(51) Int. Cl.
| | | |
|---|---|---|
| *G02B 27/01* | (2006.01) | |
| *G02B 3/12* | (2006.01) | |
| *G02F 1/137* | (2006.01) | |
| *G02F 1/1335* | (2006.01) | |

(52) U.S. Cl.
CPC ........... *G02B 27/0172* (2013.01); *G02B 3/12* (2013.01); *G02F 1/137* (2013.01); *G02F 1/133528* (2013.01)

(58) Field of Classification Search
CPC . G02B 27/0172; G02B 3/12; G02F 1/133528; G02F 1/137
See application file for complete search history.

(56) References Cited

U.S. PATENT DOCUMENTS

| | | | |
|---|---|---|---|
| 9,406,166 B2 | 8/2016 | Futterer | |
| 9,804,397 B2 | 10/2017 | Schowengerdt et al. | |
| 9,858,901 B2 | 1/2018 | Deering et al. | |
| 10,203,762 B2 | 2/2019 | Bradski et al. | |
| 2006/0028400 A1 | 2/2006 | Lapstun et al. | |
| 2014/0152926 A1* | 6/2014 | Takahashi | G02F 1/13306 349/15 |
| 2018/0084245 A1 | 3/2018 | Lapstun | |
| 2018/0284464 A1 | 10/2018 | Lu et al. | |
| 2019/0129178 A1* | 5/2019 | Patterson | G02B 27/0081 |
| 2020/0089002 A1* | 3/2020 | Lee | G02B 5/30 |
| 2021/0003848 A1* | 1/2021 | Choi | G06V 40/19 |

FOREIGN PATENT DOCUMENTS

CN 107870715 A 4/2018

\* cited by examiner

*Primary Examiner* — Nathanael R Briggs
(74) *Attorney, Agent, or Firm* — Treyz Law Group, P.C.; G. Victor Treyz; Tianyi He

(57) ABSTRACT

An electronic device such as a head-mounted device may have a display that produces a display image. The head-mounted device may have an optical system that merges real-world images from real-world objects with display images. The optical system provides the real-world images and display images to an eye box for viewing by a user. The optical system may use time interleaving techniques and/or polarization effects to merge real-world and display images. Switchable devices such as polarization switches and tunable lenses may be controlled in synchronization with frames of display images. Geometrical phase lenses may be used that exhibit different lens powers to different polarizations of light.

24 Claims, 12 Drawing Sheets

DISPLAY SYSTEM WITH TIME INTERLEAVING

This application claims the benefit of provisional patent application No. 62/886,171, filed Aug. 13, 2019, which is hereby incorporated by reference herein in its entirety.

BACKGROUND

This relates generally to electronic devices and, more particularly, to electronic devices with optical systems for merging display content and real-world content.

Electronic devices sometimes include displays. For example, wearable electronic devices such as head-mounted devices may include displays for displaying computer-generated content that is overlaid on real-world content. An optical system is used to merge real-world content and display content.

Challenges can arise in providing satisfactory optical systems for merging real-world and display content. If care is not taken, issues may arise with optical quality and other performance characteristics.

SUMMARY

An electronic device such as a head-mounted device may have a display that produces a display image. The head-mounted device may have an optical system through which a user with eyes in eye boxes may view real-world objects. During operation, the optical system may be used to merge real-world images from real-world objects with display images.

A display may produce images in frames. Different objects may be displayed in alternating image frames. The optical system may be adjusted in synchronization with the alternating image frames to display the different objects at different focal planes.

In some configurations, the optical system may have an intensity switch formed from a pair of linear polarizers and an interposed polarization switch. The polarization switch may be operated in a first state in which linearly polarized light of a given polarization is not rotated by the polarization switch and a second state in which the linearly polarized light of the given polarization is rotated by 90°.

Additional components may be incorporated in the optical system such as front and rear bias lenses with complementary lens powers, a polarization switch for helping to merge real-world images and display images in a time interleaved fashion, and geometrical phase lenses that present different lens powers to images with different polarizations. Tunable lenses may be used to place display images at different respective focal plane distances from the eye boxes.

DETAILED DESCRIPTION

Electronic devices may include displays and other components for presenting content to users. The electronic devices may be wearable electronic devices. A wearable electronic device such as a head-mounted device may have head-mounted support structures that allow the head-mounted device to be worn on a user's head.

A head-mounted device may contain a display for displaying visual content to a user. The head-mounted device may also include an optical system that helps a user view real-world objects while viewing display content. The optical system may include optical components that merge real-world image light with image light associated with images that are displayed by the display. When both real-world image light and display image light are visible to a user, the head-mounted device may place computer-generated objects within the physical environment surrounding a user.

Real-world content may be merged with display content using time-division multiplexing, polarization multiplexing, and/or other arrangements for combining light from real-world objects with light from displays.

Figure 1:
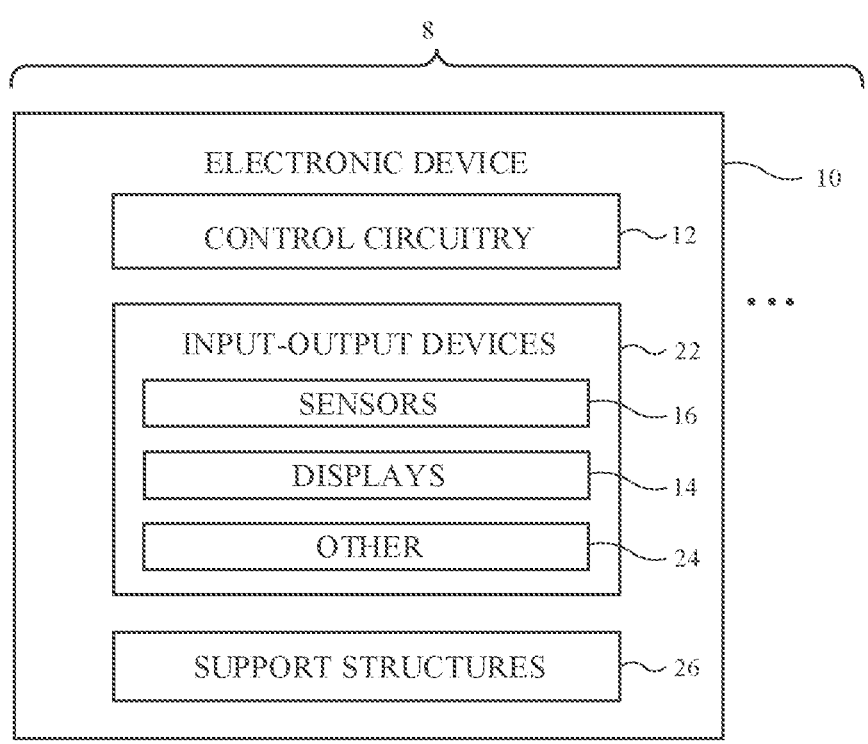
FIG. 1 is a schematic diagram of an illustrative electronic device such as a head-mounted display device in accordance with an embodiment.

A schematic diagram of an illustrative system that may include head-mounted device with an optical system for merging real-world content with display content is shown in FIG. 1. As shown in FIG. 1, system 8 may include one or more electronic devices such as electronic device 10. The electronic devices of system 8 may include computers, cellular telephones, head-mounted devices, wristwatch devices, and other electronic devices. Configurations in which electronic device 10 is a head-mounted device are sometimes described herein as an example.

As shown in FIG. 1, electronic devices such as electronic device 10 may have control circuitry 12. Control circuitry 12 may include storage and processing circuitry for controlling the operation of device 10. Circuitry 12 may include storage such as hard disk drive storage, nonvolatile memory (e.g., electrically-programmable-read-only memory configured to form a solid-state drive), volatile memory (e.g., static or dynamic random-access-memory) etc. Processing circuitry in control circuitry 12 may be based on one or more microprocessors, microcontrollers, digital signal processors, baseband processors, power management units, audio chips, graphics processing units, application specific integrated circuits, and other integrated circuits. Software code may be stored on storage in circuitry 12 and run on processing circuitry in circuitry 12 to implement control operations for device 10 (e.g., data gathering operations, operations involving the adjustment of the components of device 10 using control signals, etc.). Control circuitry 12 may include wired and wireless communications circuitry. For example, control circuitry 12 may include radio-frequency transceiver circuitry such as cellular telephone transceiver circuitry, wireless local area network (WiFi®) transceiver circuitry, millimeter wave transceiver circuitry, and/or other wireless communications circuitry.

During operation, the communications circuitry of the devices in system 8 (e.g., the communications circuitry of control circuitry 12 of device 10) may be used to support communication between the electronic devices. For example, one electronic device may transmit video and/or audio data to another electronic device in system 8. Electronic devices in system 8 may use wired and/or wireless communications circuitry to communicate through one or more communications networks (e.g., the internet, local area networks, etc.). The communications circuitry may be used to allow data to be received by device 10 from external equipment (e.g., a tethered computer, a portable device such as a handheld device or laptop computer, online computing equipment such as a remote server or other remote computing equipment, or other electrical equipment) and/or to provide data to external equipment.

Device 10 may include input-output devices 22. Input-output devices 22 may be used to allow a user to provide device 10 with user input. Input-output devices 22 may also be used to gather information on the environment in which device 10 is operating. Output components in devices 22 may allow device 10 to provide a user with output and may be used to communicate with external electrical equipment.

As shown in FIG. 1, input-output devices 22 may include one or more displays such as display(s) 14. In some configurations, display 14 of device 10 includes left and right display devices (e.g., left and right components such as left and right scanning mirror display devices, liquid-crystal-on-silicon display devices, digital mirror devices, or other reflective display devices, left and right display panels based on light-emitting diode pixel arrays (e.g., organic light-emitting display panels or display devices based on pixel arrays formed from crystalline semiconductor light-emitting diode dies), liquid crystal display panels, and/or or other left and right display devices in alignment with the user's left and right eyes, respectively. In other configurations, display 14 includes a single display panel that extends across both eyes or uses other arrangements in which content is provided with a single pixel array.

Display 14 is used to display visual content for a user of device 10. The content that is presented on display 14 may include virtual objects and other content that is provided to display 14 by control circuitry 12 and may sometimes be referred to as computer-generated content, display content, display images, display light, etc. Computer-generated content may be displayed in the absence of real-world content or may be combined with real-world content. In some configurations, a real-world image may be captured by a camera (e.g., a forward-facing camera) so that computer-generated content may be electronically overlaid on portions of the real-world image (e.g., when device 10 is a pair of virtual reality goggles with an opaque display). In other configurations, an optical system (e.g., an optical coupling system) may be used to allow computer-generated content to be optically overlaid on top of a real-world image. As an example, device 10 may have a see-through display system that provides a computer-generated image to a user through a beam splitter, prism, holographic coupler, or other optical coupler while allowing the user to view real-world objects through the optical coupler.

Input-output circuitry 22 may include sensors 16. Sensors 16 may include, for example, three-dimensional sensors (e.g., three-dimensional image sensors such as structured light sensors that emit beams of light and that use two-dimensional digital image sensors to gather image data for three-dimensional images from light spots that are produced when a target is illuminated by the beams of light, binocular three-dimensional image sensors that gather three-dimensional images using two or more cameras in a binocular imaging arrangement, three-dimensional lidar (light detection and ranging) sensors, three-dimensional radio-frequency sensors, or other sensors that gather three-dimensional image data), cameras (e.g., infrared and/or visible digital image sensors), gaze tracking sensors (e.g., a gaze tracking system based on an image sensor and, if desired, a light source that emits one or more beams of light that are tracked using the image sensor after reflecting from a user's eyes), touch sensors, buttons, capacitive proximity sensors, light-based (optical) proximity sensors, other proximity sensors, force sensors, sensors such as contact sensors based on switches, gas sensors, pressure sensors, moisture sensors, magnetic sensors, audio sensors (microphones), ambient light sensors, microphones for gathering voice commands and other audio input, sensors that are configured to gather information on motion, position, and/or orientation (e.g., accelerometers, gyroscopes, compasses, and/or inertial measurement units that include all of these sensors or a subset of one or two of these sensors), radio-frequency sensors that determine the location of other devices (and therefore the relative position of such devices relative to device 10), and/or other sensors.

User input and other information may be gathered using sensors and other input devices in input-output devices 22. If desired, input-output devices 22 may include other devices 24 such as haptic output devices (e.g., vibrating components), light-emitting diodes and other light sources, speakers such as ear speakers for producing audio output, and other electrical components. Devices 24 may include one or more adjustable optical components such as liquid crystal devices or other electrically adjustable optical components. These components may form polarization switches. Polarization switches, which may sometimes be referred to as electrically tunable wave plates or electrically controllable polarization rotators, may be adjusted to rotate linearly polarized light by different amounts (e.g., 0° or 90° depending on the state of the switch). If desired, a polarization switch may be used with a pair of polarizers to form an electrically adjustable shutter (sometimes referred to as a light modulator or intensity switch). If desired, devices 24 may include tunable lenses. Tunable lenses may be formed from liquid crystal devices and other electrically adjustable devices. Tunable lenses may be adjusted to produce different lens powers (e.g., desired positive and/or negative lens powers) and/or to adjust the lateral location of the lens center (e.g., to accommodate different user gaze directions). For example, tunable lenses can be adjusted to move the position of the centers of the lenses based on information gathered in real time from a gaze detection system.

If desired, device 10 may include circuits for receiving wireless power, circuits for transmitting power wirelessly to other devices, batteries and other energy storage devices (e.g., capacitors), joysticks, buttons, and/or other components.

Electronic device 10 may have housing structures (e.g., housing walls, straps, etc.), as shown by illustrative support structures 26 of FIG. 1. In configurations in which electronic device 10 is a head-mounted device (e.g., a pair of glasses, goggles, a helmet, a hat, etc.), support structures 26 may include head-mounted support structures (e.g., a helmet housing, head straps, temples in a pair of eyeglasses, goggle housing structures, and/or other head-mounted structures). The head-mounted support structures may be configured to be worn on a head of a user during operation of device 10 and may support display(s) 14, sensors 16, other components 24, other input-output devices 22, and control circuitry 12.

Figure 2:
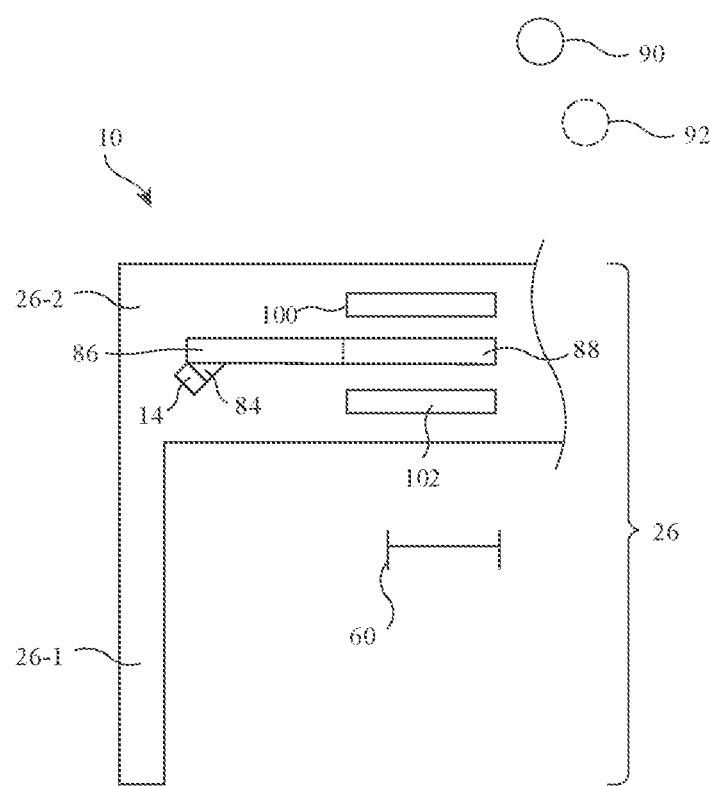
FIG. 2 is a top view of an illustrative head-mounted device in accordance with an embodiment.

FIG. 2 is a top view of electronic device 10 in an illustrative configuration in which electronic device 10 is a head-mounted device. As shown in FIG. 2, electronic device 10 may include support structures 26 that are used in housing the components of device 10 and mounting device 10 onto a user's head. These support structures may include, for example, structures that form housing walls and other structures for a main unit (e.g., support structures 26-2) and additional structures such as straps, temples, or other supplemental support structures (e.g., support structures 26-1) that help to hold the main unit and the components in the main unit on a user's face so that the user's eyes are located within eye boxes 60.

Display 14 may include left and right display portions (e.g., sometimes referred to as left and right displays, left and right display devices, left and right display components, or left and right pixel arrays). An optical system for device 10 may be formed from couplers 84 (sometimes referred to as input couplers), waveguides 86, and an optical system formed from one or more optical components such as components 100 and 102. Components 100 may be interposed between the front (outwardly facing) side of device 10 and waveguides 86 (e.g., between real-world object 90 and waveguides 86). Components 102 may be interposed between waveguides 86 and the rear (inwardly facing) side of device 10 (e.g., between waveguides 86 and eye boxes 60. Components 100 and 102 may include fixed and/or adjustable components that help place computer-generated content at a desired focal plane and that help merge this content with real-world image light that is passing through components 10 and 102 and waveguide 86 to eye boxes 60. A user with eyes located in eye boxes 60 may view real-world objects through the optical system formed from components 100, waveguide 86, and components 102 and other components of device 10 while viewing overlaid computer-generated content from display 14.

As shown in FIG. 2, the left portion of display 14 may be used to create an image for a left-hand eye box 60 (e.g., a location where a left-hand image is viewed by a user's left eye). The right portion of display 14 may be used to create an image for a right-hand eye box 60 (e.g., a location where a right-hand image is viewed by a user's right eye). In the configuration of FIG. 2, the left and right portions of display 14 may be formed by respective left and right display devices (e.g., digital mirror devices, liquid-crystal-on-silicon devices, scanning microelectromechanical systems mirror devices, other reflective display devices, or other displays).

Optical couplers 84 (e.g., prisms, holograms, etc.) may be used to couple respective left and right images from the left and right display portions into respective left and right waveguides 86. The images may be guided within waveguides 86 in accordance with the principal of total internal reflection. In this way, the left and right images may be transported from the left and right sides of device 10 towards locations in the center of device 10 that are aligned with left and right eye boxes 60. Waveguides 86 may be provided with respective left and right output couplers 88 such as holograms formed on or in the material of waveguides 86. The left and right output couplers 88 may respectively couple the left and right images from the left and right waveguides 86 towards the left and right eye boxes 60 for viewing by the user. This allows a user to view a computer-generated image (display image) such as computer-generated object 92 overlaid over real-world objects such as real-world object 90.

By adjusting lenses and other optical components in components 100 and/or 102, the distance from device 10 at which display image 92 is in focus for the user viewing from eye boxes 60 can be adjusted. These adjustments may be made without affecting the focus of real-world objects such as real-world object 90. In this way, real-world objects such as real-world object 90 may be observed by the user as if device 10 were not present (e.g., without any intervening optical components) while computer-generated content such as virtual object 92 may be placed within the scene being viewed by the user at one or more desired distances from the user.

Time-interleaving and polarization control techniques may be used in merging real-world content and display content in the optical system for device 10.

Figure 3A:
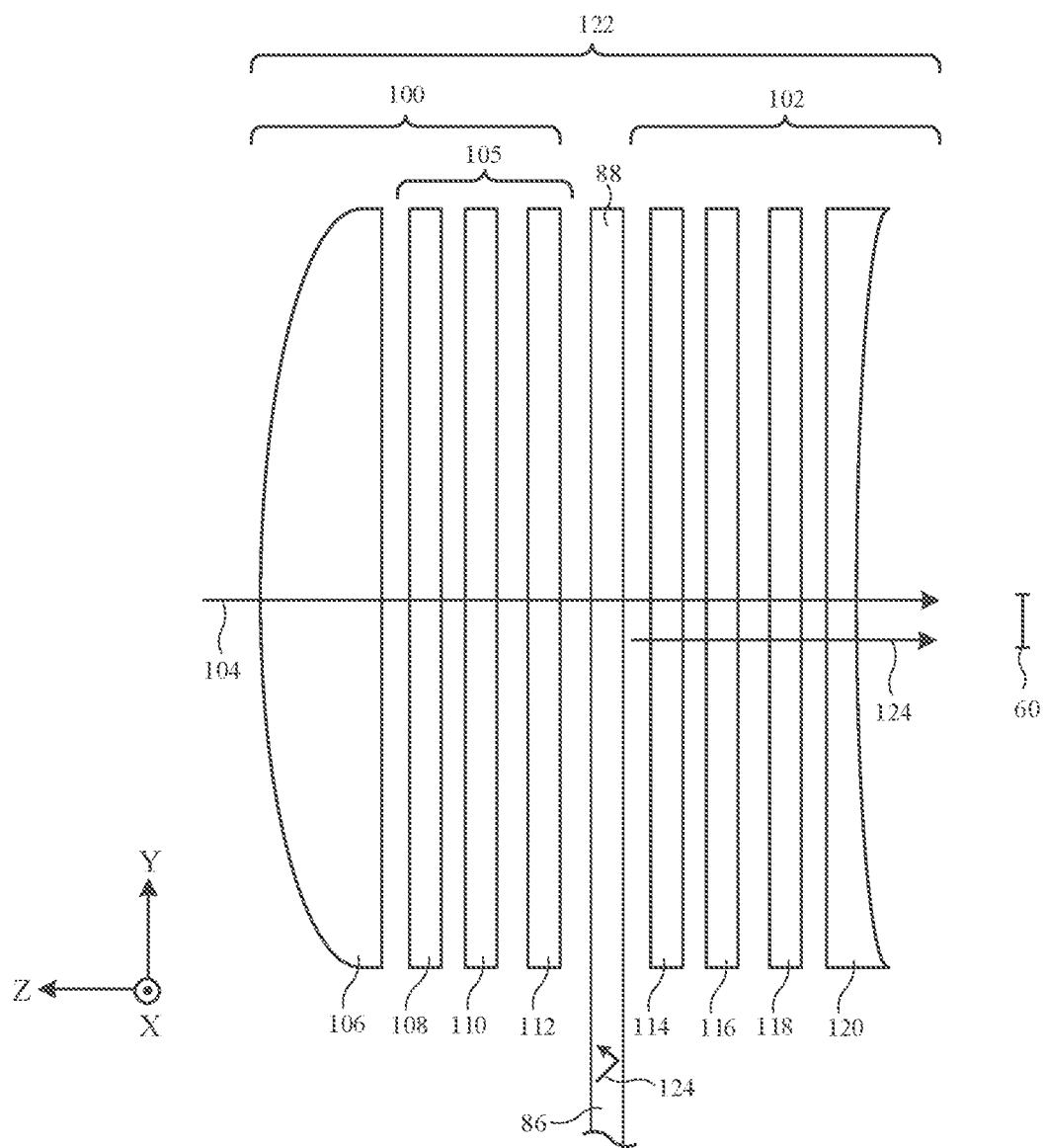
FIGS. 3A and 3B are cross-sectional views of illustrative optical systems with time interleaving and tunable lenses in accordance with embodiments.

Consider, as an example, the time-division multiplexing arrangement of FIG. 3A. FIG. 3A is a diagram of an illustrative optical system (optical system 122) that may be used for both the left-hand and right-hand portion of device 10. As shown in FIG. 3A, system 122 includes outer optical components such as optical components 100 and inner optical components such as optical components 102. Electrically adjustable devices in components 100 and/or 102 are controlled by control circuitry 12. Waveguide 86 and, in particular, the portion of waveguide 86 with output coupler 88, is interposed between components 100 and 102. Real-world image light 104 passes through system 122 and is viewable by a user's eye at eye box 60. Computer-generated image light (display light) 124 is guided to output coupler 88 through waveguide 86 to output coupler 88. Output coupler 88 couples light 124 out of waveguide 86, so that light 124 passes through components 102 to eye box 60.

System 122 has bias lenses 106 and 120. The powers of bias lenses 106 and 120 may be complementary. For example, bias lens 106 may have a positive lens power such as 1.5 diopter and bias lens 120 may have a negative lens power such as a −1.5 diopter. With this type of arrangement, the positive power of lens 106 is cancelled by the corresponding negative power of lens 120, so that the net effect is as if there were no lens present between the real-world objects and eye box 60 (e.g., real-world image 104 experiences a zero lens power from lenses 106 and 120 when traveling to eye box 60). At the same time, the negative power of lens 120 is present in components 102.

Components 100 include electronic shutter 105. Electronic shutter 105, which may sometimes be referred to as an intensity switch or electrically adjustable light modulator, may include linear polarizer 108, polarization switch 110, and linear polarizer 112. Linear polarizer 108 may have a pass axis aligned with the Y axis, so that light 104 is linearly polarized along the Y axis after passing through polarizer 108. Polarization switch 110, which may sometimes be referred to as an electrically adjustable wave plate, electrically adjustable retarder, or electrically adjustable polarization controller, may be formed from an electrically adjustable optical component such as a twisted nematic liquid crystal layer (as an example). Alternating-current drive signals may be used to control the operation of polarization switch 110 to avoid undesirable charge accumulation effects that might otherwise arise from using a control signal of a fixed polarity.

In a first state (sometimes referred to as an OFF state, where a 0V peak-to-peak drive signal is applied), polarization switch 110 rotates the polarization of incoming linearly polarized light from polarizer 108 by 90° so that light 104 is polarized along the X axis after exiting polarization switch 110. Linear polarizer 112 has a pass axis aligned with the X axis and therefore passes light 104 in the first state. In a second state (sometimes referred to as an ON state, where a 20V peak-to-peak drive signal or other suitable drive signal is applied), polarization switch 110 does not rotate the polarization of incoming linearly polarized light. In this state, light 104 is blocked by polarizer 112. As this demonstrates, the adjustability of polarization switch 110 allows polarizer 108, polarization switch 110, and polarizer 112 to serve as an electrically adjustable shutter that can either block or pass real-world light 104 to eye box 60.

Optical components 102 may include linear polarizer 114. Linear polarizer 114 may have a pass axis aligned with the X axis and may serve to block light polarized along the Y axis as described in connection with polarizer 112. The inclusion of polarizer 112 may help reduce display light that leaks out of output coupler 88 in the +Z direction. If desired, polarizer 112 may be omitted. In configurations in which polarizer 112 is omitted, polarizer 114, polarizer 108, and polarization switch 110 form the electronic shutter.

Optical components 102 may include a tunable lens such as a liquid crystal lens. The position of the lens center of the tunable lens and/or the lens power of the lens may be adjusted by control circuitry 12. For example, the position of the lens center of the adjustable lens may be controlled in real time based on information from a gaze tracking system that is monitoring the direction of gaze of the user (e.g., by monitoring the user's eye in eye box 60). This allows the center of the lens to be aligned along the user's direction of gaze.

In the example of FIG. 3A, components 102 include liquid crystal lens 118. Lens 118 is electrically adjustable. During operation, control circuitry 12 can adjust the power of liquid crystal lens 118 to place virtual objects in desired focal planes. Liquid crystal lens 118 may, as an example, exhibit a positive lens power that is tunable between first and second positive lens power values, may exhibit a negative lens power that is tunable between first and second negative lens power values, or may have a lens power that is adjustable between a positive value (e.g., +1 diopter) and a negative value (e.g., −1 diopter). The net power of the lens system between output coupler 88 and eye box 60 is given by the combined lens powers of inner (rear) bias lens 120 and liquid crystal lens 118. In some configurations, inclusion of a negative rear bias lens may help provide a desired overall negative lens power to the user (e.g., a lens power ranging from −0.5 diopter which may be used to place virtual objects at a focal plane distance of 2 m from eye box 60 to −2.5 diopter which may be used to place virtual objects at a focal plane distance of 40 cm from eye box 60) while allowing lens 118 to exhibit both positive and negative lens powers, thereby helping to avoid tuning challenges that may sometimes be present when creating only negative liquid crystal lens powers. Lens 118 may be configured to exhibit a desired lens power (e.g., 1 diopter and/or other suitable lens powers) for light polarized along the Y axis while exhibiting no lens power (0 diopter) for light polarized along the X axis. Lens 118 may have any suitable number of layers of liquid crystal cells (e.g., one layer, two or more layers, three or more layers, etc.). If desired, a multiple-layer configuration may be used for lens 118 to allow lens 118 to provide an electrically adjustable lens center position, to allow the optical performance of lens 118 to be enhanced, etc.

Time division multiplexing may be used by optical system 122 to merge real-world light 104 and display light 124 at eye box 60 for viewing by a user.

During first time periods, which may sometimes be referred to as "world view off" periods, polarization switch 110 of intensity switch 105 is adjusted to block real-world light 104. Display light 124 from output coupler 88 is linearly polarized along the X axis by polarizer 114. Optical system 122 may have a polarization switch such as polarization switch 116. Polarization switch 116 may be turned OFF whenever polarization switch 110 is ON and intensity switch 105 is blocking real-world image light 104. Because polarization switch 116 is OFF, polarization switch 116 rotates the polarization of display light 124 so that display light 124 is aligned along the Y axis. Liquid crystal lens 118 is adjusted by control circuitry 12 to produce a desired lens power for light polarized along the Y axis. Bias lens 120 provides additional desired lens power. Light 124 therefore reaches eye box 60 with a desired lens power interposed between optical coupler 88 and eye box 60. By adjusting this lens power (e.g., when control circuitry 12 adjusts lens 118) while producing synchronized image frames with display 14 while intensity switch 105 is opaque and blocking real-world light, virtual objects associated with respective frames of display image light 124 may be placed in one or more desired focal planes.

Figure 3B:
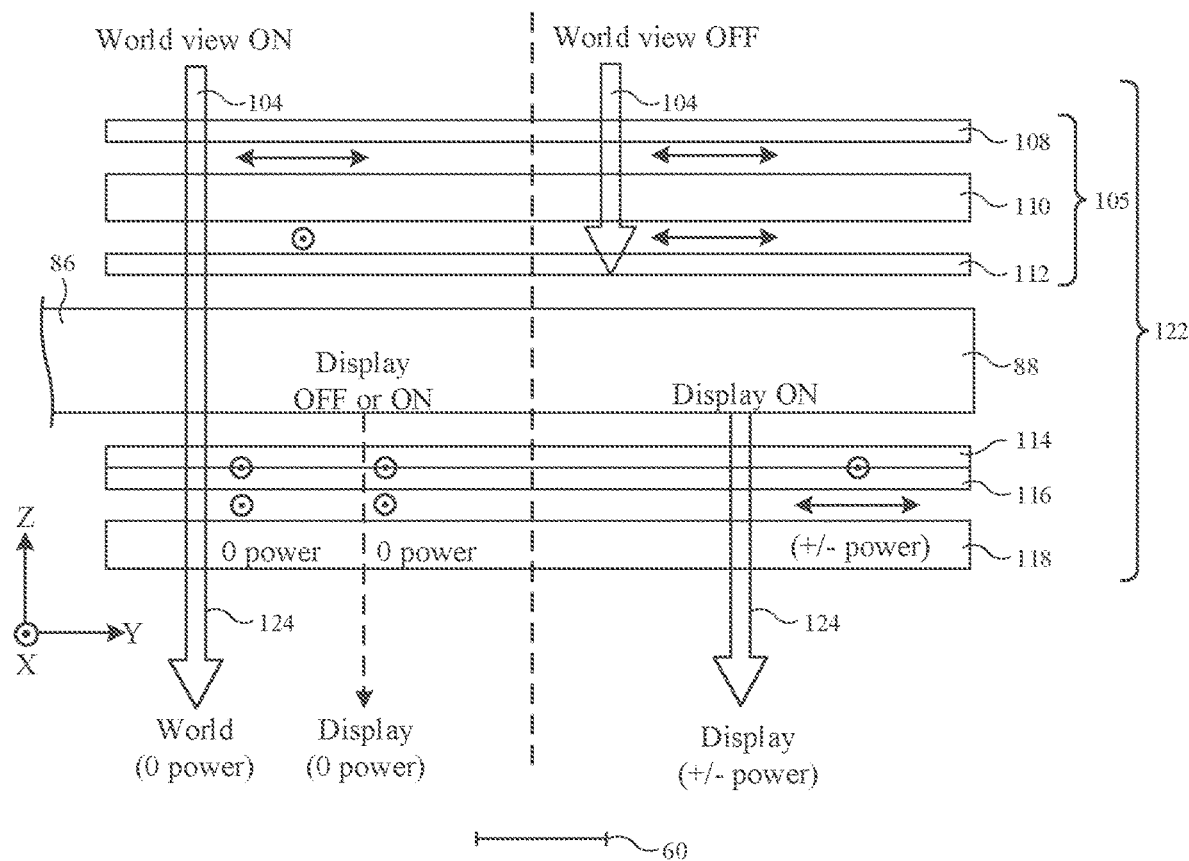

During second time periods, which may sometimes be referred to as "world view on" periods, polarization switch 110 of intensity switch 105 is adjusted to pass real-world light 104 while display 14 is optionally turned off (and light 124 is not produced). Polarization switch 116 is placed in a state that allows light to pass through lens 118. During the second time periods, the user views real-world objects through system 122. Liquid crystal lens 118 is only sensitive to light polarized along the Y axis and is insensitive to light polarized along the X axis. Light 104 is polarized along the X axis when passing through polarizer 114 and polarization switch 116 may be turned ON, so light 104 maintains its polarization state along the X-axis when passing through lens 118 and is therefore not affected by lens 118. The combined optical powers of front bias lens 106 and rear bias lens 120 cancel (in this example), so that no net lens power is present between eye box 60 and the real world (i.e., real-world light 104 reaches eye box 60 unaffected by optical system 122). As shown in FIG. 3B, while real-world light 104 passes through system 122 in the second time periods (world view on periods), display 14 can be either turned on or off. Display 14 may, for example, be turned on or off depending on the depth of the virtual content to be displayed for the user in eye box 60. For example, display 14 can be turned on if the virtual content that is to be placed at the focal plane corresponding to lens 118 has zero optical power.

During operation, control circuitry 12 may operate the polarization switches and other adjustable components of device 10 synchronization (e.g. alternating between world view on and world view off periods). The relative duty cycle between the world view on and off states may be 50% (50% on and 50% off) or may have any other suitable value (e.g., 60%-70% on, less than 80% on, more than 30% on, etc.). The world view may also be on with 100% duty cycle when there is no need to adjust the depth of the virtual content. In other words, in the configuration of FIGS. 3A and 3B (and, if desired, other configurations such as the configurations of FIGS. 6 and 9), the depth feature can be disabled when it is desired to increase the brightness of the world view.

If desired, other polarization-dependent lenses may be used for lens 118. For example, a geometrical phase lens or a fixed birefringent lens may be used in place of tunable lens 118. A fixed polarization-dependent lens provides two different lens power choices to system 122, depending on the polarization state of the light passing through the lens. Eye tracking and lens center adjustments are not be used in this configuration, because the lens center positions of the fixed lens are fixed.

If desired, optical system 122 may use pairs of complementary geometrical phase lenses. Geometrical phase lenses may be implemented using liquid crystal lens structures configured to exhibit a positive lens power for one circular polarization such as right-hand circular polarization (RCP) and a negative lens power for an opposite circular polarization such as left-hand circular polarization (LCP). Because both positive and negative lens powers are exhibited when presented with unpolarized light (containing equal portions of RCP and LCP light), polarization control is used to avoid undesired double images.

Figure 4A:
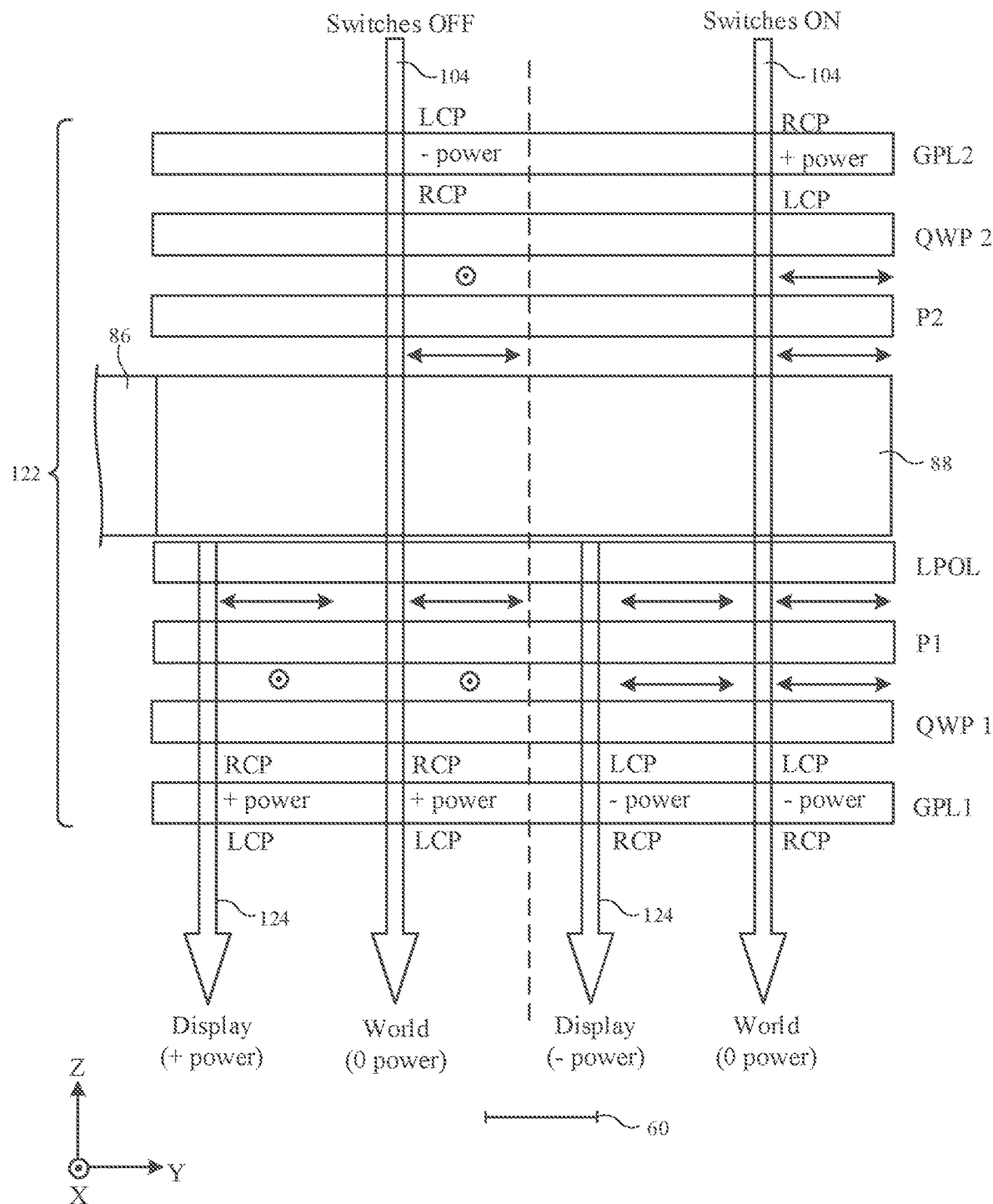
FIGS. 4A, 4B, 5A, 5B, and 6-9 are cross-sectional side views of illustrative optical systems with geometrical phase lenses in accordance with an embodiment.

FIG. 4A shows an optical system based on geometrical phase lenses GPL1 and GPL2. Front and rear bias lenses 106 and 120 are omitted from FIG. 4A and the subsequent FIGS. to avoid over-complicating the drawings.

As shown in FIG. 4A optical system 122 may have quarter wave plate QWP2 between geometrical phase lens GPL2 and polarization switch P2 (an electrically adjustable polarization rotator). Linear polarizer LPOL is interposed between waveguide 86 (output coupler 88) and polarization switch P1. Quarter wave plate QWP1 is located between polarization switch P1 and lens GPL1. In this configuration, polarization switches P1 and P3 operate as polarization rotators for linear polarization. In other configurations, quarter wave plate QWP2 and polarization switch P2 can be combined to form a different type of polarization switch which works for circular polarization. Similarly, quarter wave plate QWP1 and polarization switch P1 can be combined to form a polarization switch that works for circularly polarized light. In other words, quarter wave plates QWP1 and QWP2 can be omitted.

When polarization switch P2 and polarization switch P1 are OFF, RCP real-world light 104 is converted to LCP light by lens GPL2. Quarter wave plate QWP2 converts this LCP light to light that is linearly polarized along the Y axis. Polarization switch P2 is off and therefore rotates this light so that it is polarized along the X axis. Linear polarizer linear POL blocks this light. In this way, RCP real-world light is prevented from reaching the user.

When polarization switch P2 and polarization switch P1 are OFF, LCP real-world light 104 is converted to RCP light by lens GPL2, which exhibits a negative lens power. This light is converted to linearly polarized light that is polarized along the X axis by quarter wave plate QWP2. Polarization switch P2 is OFF and therefore rotates the polarization of this light so that it is linearly polarized along the Y axis. After passing through waveguide 86 (output coupler 88) and linear polarizer LPOL, this light reaches polarization switch P1. Polarization switch P1 is OFF and therefore rotates the polarization of light 104 so that the light exiting polarization switch P1 is polarized along the X axis. Quarter wave plate QWP1 converts this linearly polarized light to RCP light. As the RCP light passes through lens GPI, lens GPI exhibits a positive lens power equal and opposite to that of lens GPL2, so real-world light 104 is not affected by any lens power (e.g., the lens power of lenses GPL2 and GPL1 when combined is 0 diopter, so that real-world light 104 can be viewed by the user as if system 122 were not present).

When polarization switches P and P2 are ON, LCP light 104 is blocked. RCP light passes through lens GPL2, which exhibits a positive lens power. Polarization switches P1 and P2 are ON and therefore do not change the polarization state of the light passing through them. After passing through the components between lens GPL2 and GPL1, light 104 becomes left-hand circularly polarized. As shown in FIG. 4A, when LCP light 104 reaches lens GPL1, lens GPL1 exhibits a negative lens power equal and opposite to the positive lens power of lens GPL2. As when polarization switches P1 and P2 were both OFF, real-world light 104 is unaffected by the presence of lenses GPL1 and GPL2 when polarization switches P1 and P2 are ON, because the lens powers of lenses GPL1 and GPL2 cancel each other.

Display light 124, in contrast, is affected by the switching of polarization switches P1 and P2. When these switches are OFF, light 124 is RCP at the input to lens GPL1, which exhibits a positive lens power. When polarization switches P1 and P2 are ON, however, light 124 is LCP at the input to lens GPL1, so that lens GPL1 exhibits a negative lens power.

During operation, the states of polarization switches P1 and P2 are adjusted in tandem (e.g., by alternating between ON and OFF in synchronization with each other with a desired duty cycle). Real-world light 104 is unaffected by the changes in state of polarization switches P1 and P2, which allows the user to view the real world through system 122 as if system 122 were not present. Display light 124 experiences alternating lens powers due to its changing polarization state. When converted to RCP light, lens GPL1 applies a positive lens power to display light 124, whereas when converted to LCP light, lens GPL1 applies a negative lens power to display light 124. The system of FIG. 4A therefore allows virtual objects (e.g., display image frames from display 14 that are appropriately synchronized with the switching of polarization switches 1 and 2) to be placed at two different focal planes. Systems such as the system of FIG. 4A and the other systems described herein may, if desired, use component stacking arrangements to implement additional levels of focal plane positioning. The arrangements where optical system 122 exhibits first and second states with first and second respective focal plane positions for virtual objects in display images are described herein as an example.

Figure 4B:
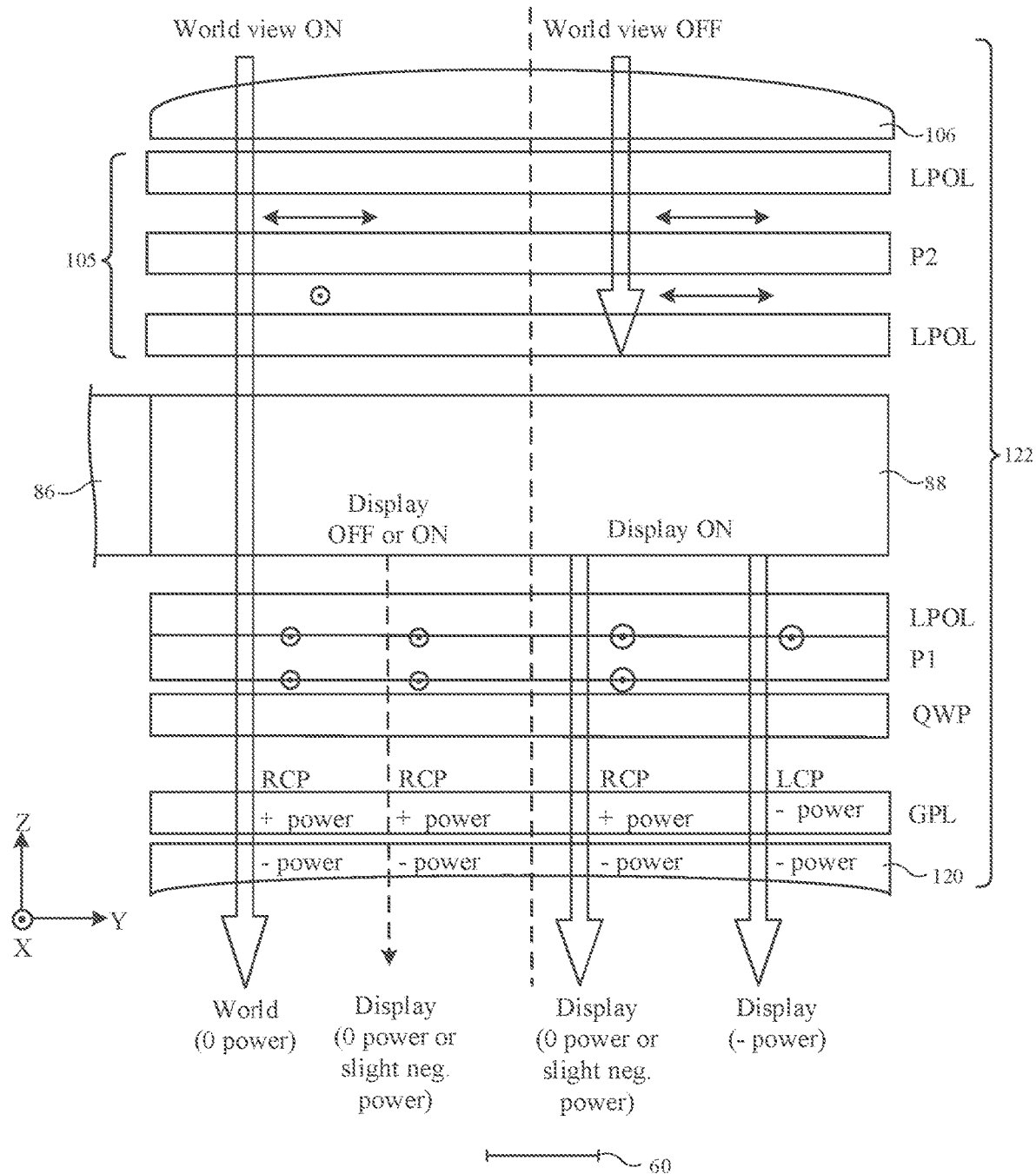

In the illustrative configuration of FIG. 4B, intensity switch 105 has a pair of linear polarizers LPOL and a switchable polarizer P2. A linear polarizer LPOL, polarization switch P1 (for selecting a desired lens power for geometric phase lens GPL), and quarter wave plate QWP are located between geometric phase lens GPL and waveguide 86. With this configuration, the power of the bias lens can be configured such that display 14 may exhibit slight negative power when the positive power of geometric phase lens GPL is selected. In an example, geometric phase lens GPL has a power of +/−1D, negative bias lens 120 has a power of −1.5D, and positive bias lens 106 has a power of 0.5D. When the positive power is selected for geometric phase lens GPL, display power will be +1D−1.5D=−0.5D and the power applied to real-world light (sometimes referred to as world power) will be +0.5D+1D−1.5D=0D. When negative power is selected, display power will be −1D−1.5D=−2.5D.

Figure 5A:
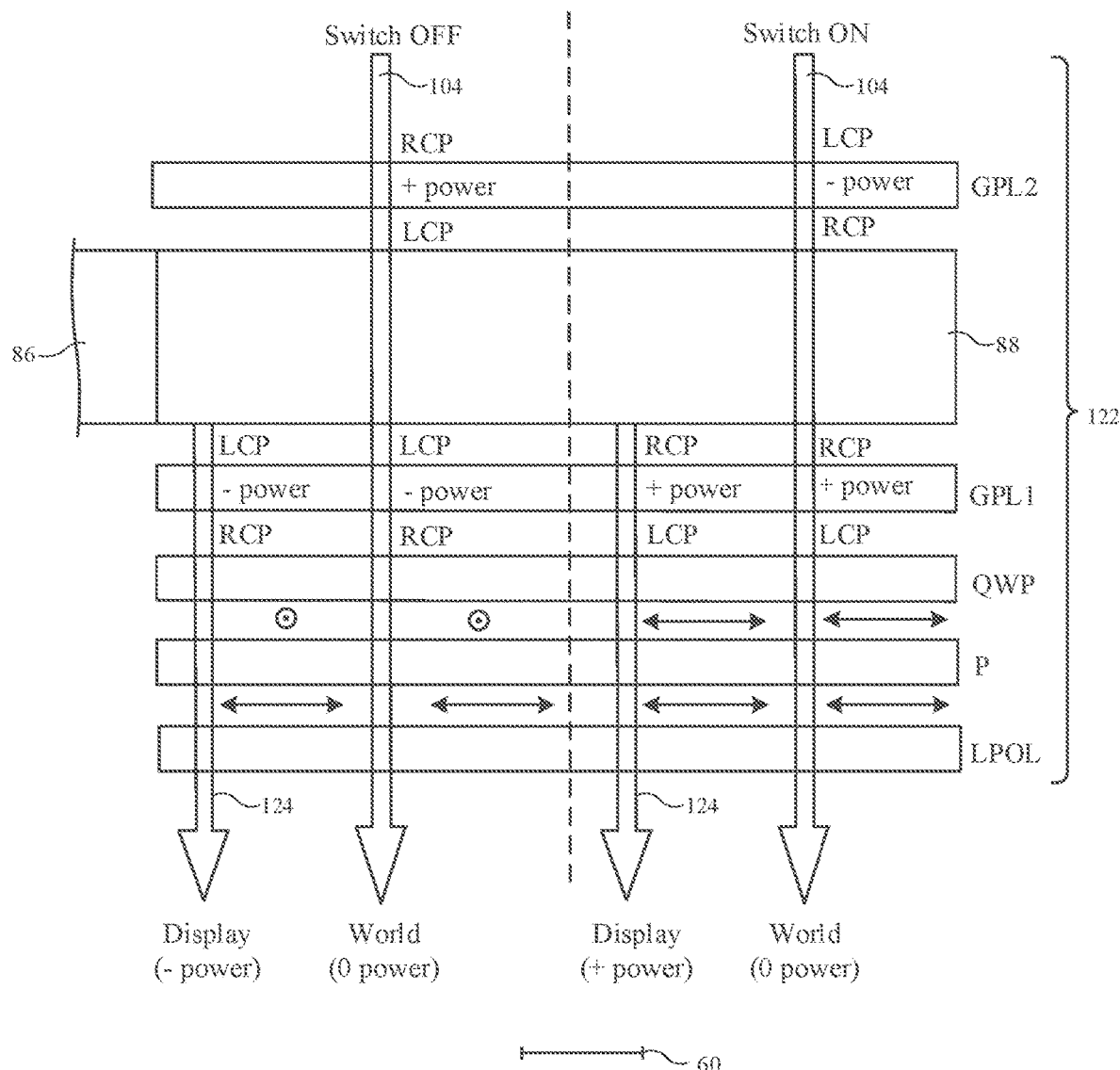

In the illustrative configuration of FIG. 5A, optical system 122 has only a single polarization switch (switch P) and the location of linear polarizer LPOL has been changed so that linear polarizer LPOL is between polarization switch P and eye box 60. There is also only a single quarter wave plate (QWP) in system 122 of FIG. 5A. As shown in FIG. 5A, real-world light 104 passes through system 122 with 0 lens power regardless of whether polarization switch P is ON or OFF, because the positive power of geometrical phase lens GPL2 cancels the equal and opposite negative lens power of geometrical phase lens GPL1, whereas display light 124 passes through a negative lens (GPL1) when polarization switch P is OFF and passes through a positive lens (GPL1) when the polarization switch is ON.

Figure 5B:
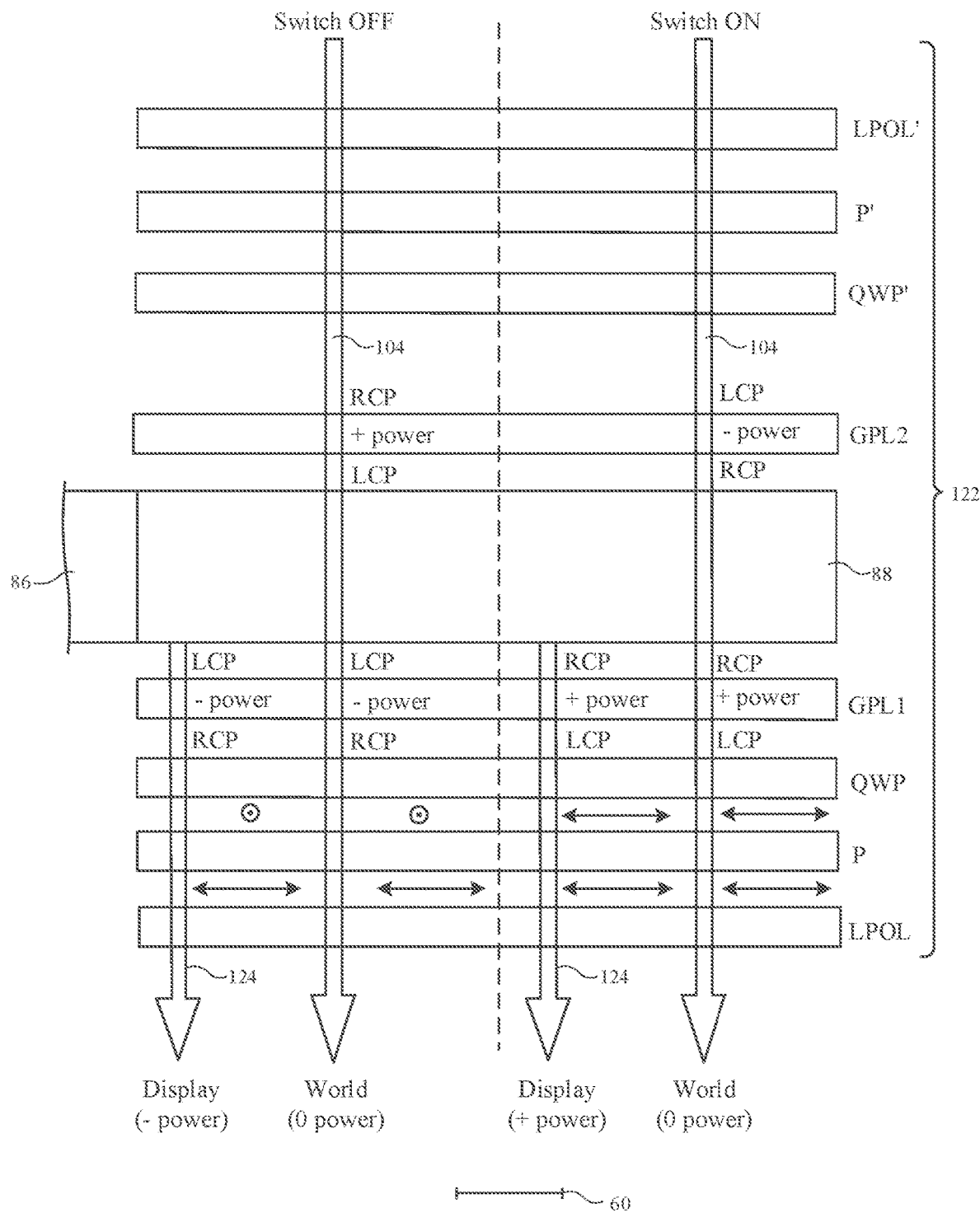

In the illustrative configuration of FIG. 5B, a clean-up polarization switch formed from linear polarizer LPOL', polarization switch P', and quarter wave plate QWP' has been added to optical system 122 of FIG. 5A to help block undesired ghost image light and thereby improve the contrast ratio between the main image and ghost image. Polarization switch P' may be operated in synchronization with polarization switch P.

Figure 6:
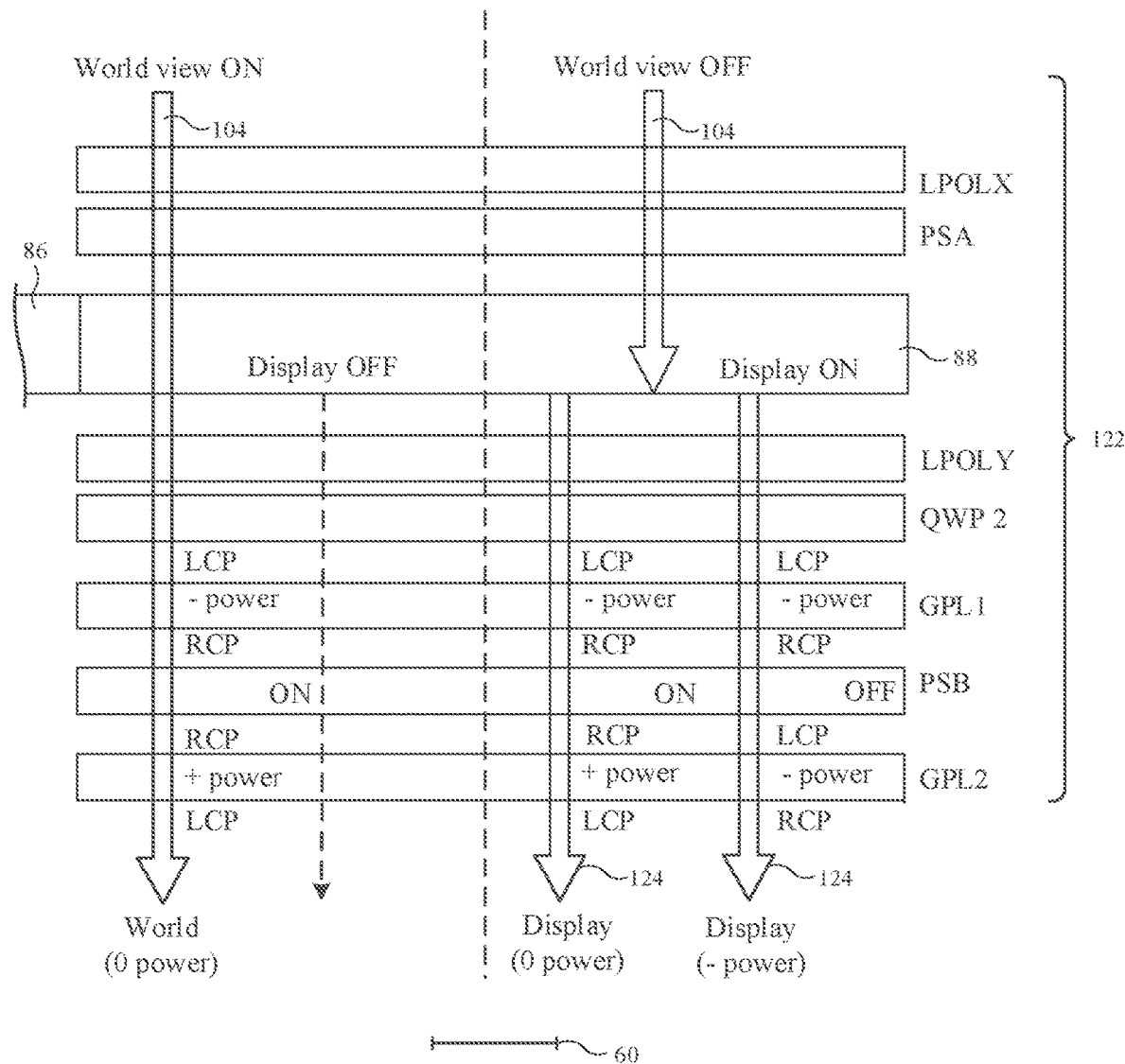

In the illustrative configuration of FIG. 6, system 122 has a polarization switches PSA and PSB. Switch PSA may be used with a pair of linear polarizers LPOLX and LPOLY to implement an intensity switch. Switch PSB may be configured so that when switch PSB is ON, RCP light passes through switch PSB unaffected and may be configured so that when switch PSB is OFF, incoming RCP light is converted to LCP light.

During operation in "world view on" mode, display 14 is turned off and switch PSA (and the electronic switch formed from polarizers LPOLX and LPOLY and polarization switch PSA) may be adjusted to pass light 104 through waveguide 86 and coupler 88. LCP light is presented to lens GPL1, which exhibits a negative lens power and RCP light is presented to lens GPL2, which exhibits a cancelling positive lens power.

During operation in "world view off" mode, display 14 is turned on and switch PSA is adjusted to block real-world light 104. Frames of image light (e.g., alternating first and second frames corresponding to alternating first and second virtual objects) are synchronized with the state of polarization switch PSB. When the first frames are presented, switch PSB is turned ON and light 124 experiences a negative lens power when passing through lens GPL1 and a cancelling positive lens power when passing through lens GPL2. When the second frames are presented, switch PSB is turned OFF and light 124 experiences a negative lens power when passing through lens GPL1 and another negative lens power when passing through lens GPL2. In this way, the first frames of display light experience 0 lens power and the second frames of display light experience a negative lens power (equal to the summation of the negative lens powers of lenses GPL1 and GPL2). As with the other systems shown in the FIGS., bias lenses such as a front positive fixed bias lens and a complementary rear negative fixed bias lens may be included in system 122.

Figure 7:
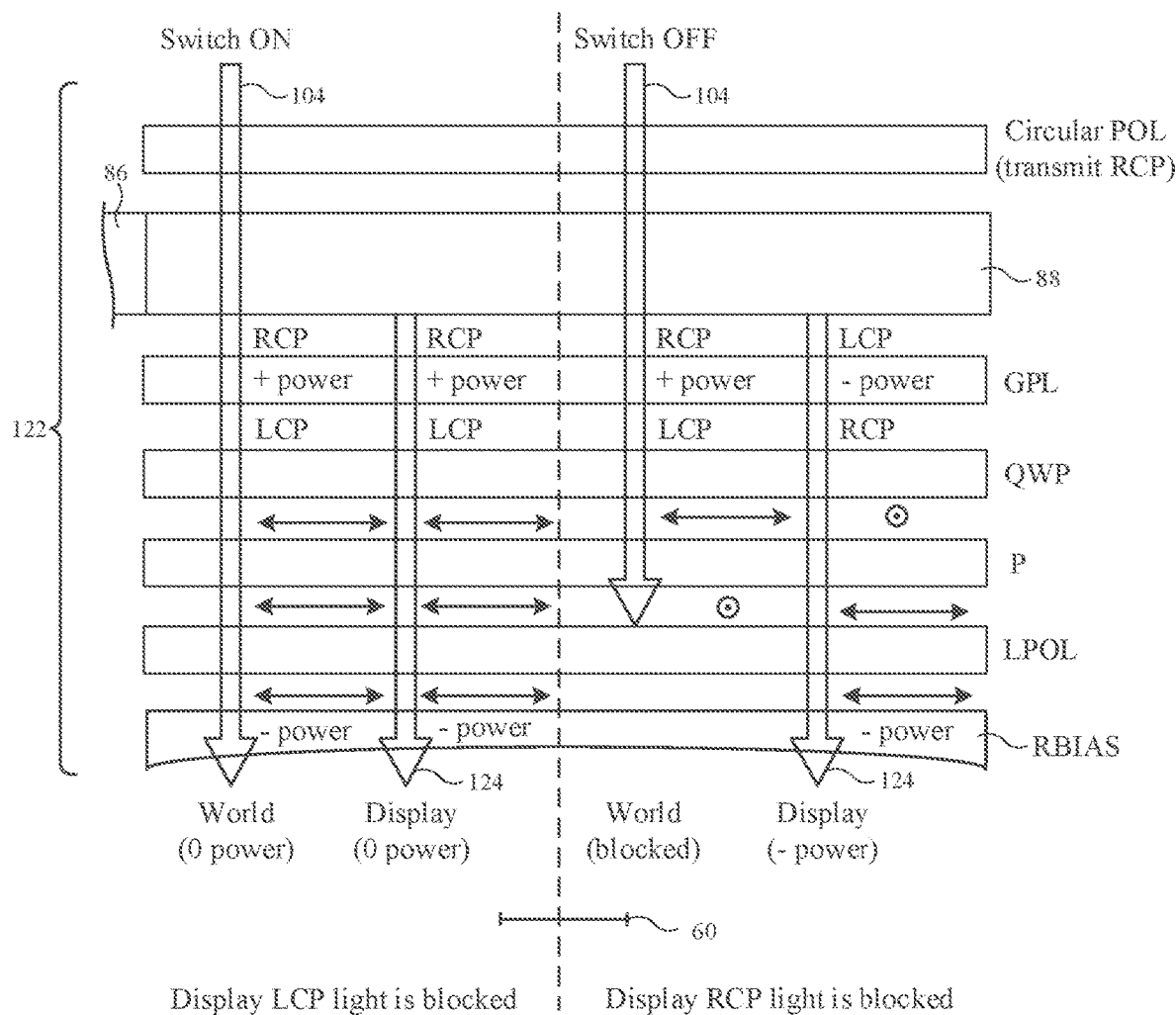

Another illustrative arrangement for optical system 122 is shown in FIG. 7. When polarization switch P is ON, real-world light 104 experiences 0 lens power and RCP display light 124 experiences 0 lens power. LCP display light is blocked. When polarization switch P is OFF, real-world light is blocked by linear polarizer LPOL and display light 124 experiences a negative lens power. Display 14 can be turned on and off depending on desired content depth.

Figure 8:
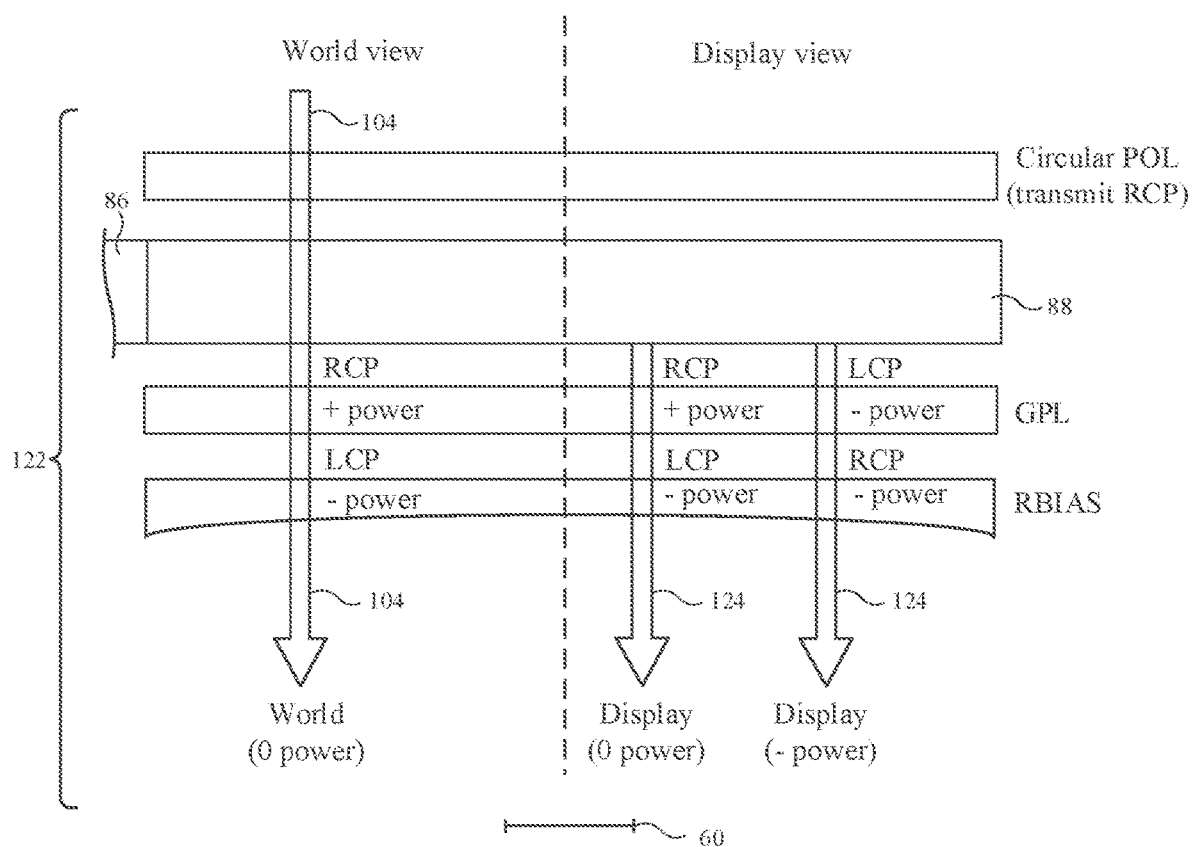

In the illustrative configuration of FIG. 8, display 14 supplies waveguide 86 alternately with RCP display light 124 or LCP display light 124 and waveguide 86 preserves the polarization state of the light from display 14. Components such as the quarter wave plate QWP, linear polarizer LPOL, and polarization switch P of FIG. 7 may be omitted. Different virtual object locations are achieved by displaying content for different depths with different polarizations (RCP for one depth and LCP for another depth).

Figure 9:
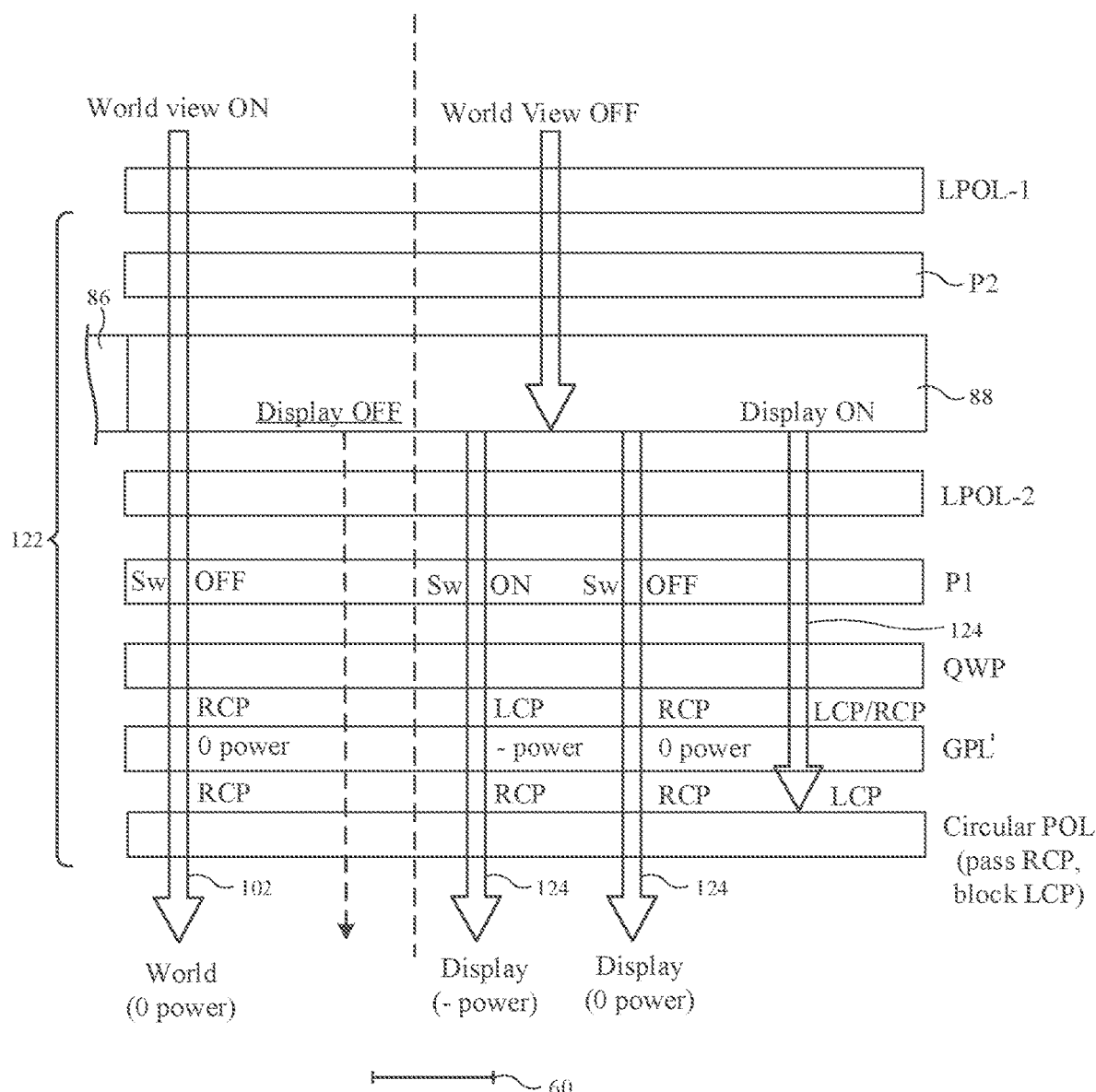

FIG. 9 shows another illustrative configuration for optical system 122. In the example of FIG. 9, geometrical phase lens (GPL') has been configured to pass $0^{th}$ order light (light striking lens GPL' at an angle parallel to the surface normal of lens GPL') with an intensity comparable to that of the RCP and LCP output light from lens GPL'. Accordingly, when lens GPL' of FIG. 9 is presented with unpolarized light (e.g., light having equal parts of LCP and RCP light), there will be three outputs: 1) LCP light (experiencing a negative lens power), 2) RCP light (experiencing a positive lens power), and 3) $0^{th}$ order light (experiencing no lens power).

Optical system 122 of FIG. 9 is configured to block LCP light exiting lens GPL'. When display 14 is off, polarization switch P2 (which forms an electronic shutter with linear polarizers LPOL-1 and LPOL-2) is configured to allow real-world light to pass to polarization switch P1. Polarization switch P1 is OFF, which allows the real-world light to be passed to lens GPL' as RCP light. As real-world light 104 passes through lens GPL', lens GPL' exhibits a 0 lens power.

When display 14 is on, polarization switch P2 is adjusted so that real-world light 104 is blocked. The state of polarization switch P1 is alternated in synchronization with the image frames produced by display 14, so that virtual objects can be presented in different focal planes. When switch P1 is ON, light 124 experiences a negative lens power when passing through lens GPL' and when switch P is OFF, light 124 experiences a 0 lens power when passing through lens GPL'.

System 8 may gather and use personally identifiable information. It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Physical Environment

A physical environment refers to a physical world that people can sense and/or interact with without aid of electronic systems. Physical environments, such as a physical park, include physical articles, such as physical trees, physical buildings, and physical people. People can directly sense and/or interact with the physical environment, such as through sight, touch, hearing, taste, and smell.

Computer-Generated Reality

In contrast, a computer-generated reality (CGR) environment refers to a wholly or partially simulated environment that people sense and/or interact with via an electronic system. In CGR, a subset of a person's physical motions, or representations thereof, are tracked, and, in response, one or more characteristics of one or more virtual objects simulated in the CGR environment are adjusted in a manner that comports with at least one law of physics. For example, a CGR system may detect a person's head turning and, in response, adjust graphical content and an acoustic field presented to the person in a manner similar to how such views and sounds would change in a physical environment. In some situations (e.g., for accessibility reasons), adjustments to characteristic(s) of virtual object(s) in a CGR environment may be made in response to representations of physical motions (e.g., vocal commands).

A person may sense and/or interact with a CGR object using any one of their senses, including sight, sound, touch, taste, and smell. For example, a person may sense and/or interact with audio objects that create 3D or spatial audio environment that provides the perception of point audio sources in 3D space. In another example, audio objects may enable audio transparency, which selectively incorporates ambient sounds from the physical environment with or without computer-generated audio. In some CGR environments, a person may sense and/or interact only with audio objects.

Examples of CGR include virtual reality and mixed reality.

Virtual Reality

A virtual reality (VR) environment refers to a simulated environment that is designed to be based entirely on computer-generated sensory inputs for one or more senses. A VR environment comprises a plurality of virtual objects with which a person may sense and/or interact. For example, computer-generated imagery of trees, buildings, and avatars representing people are examples of virtual objects. A person may sense and/or interact with virtual objects in the VR environment through a simulation of the person's presence within the computer-generated environment, and/or through a simulation of a subset of the person's physical movements within the computer-generated environment.

Mixed Reality

In contrast to a VR environment, which is designed to be based entirely on computer-generated sensory inputs, a mixed reality (MR) environment refers to a simulated environment that is designed to incorporate sensory inputs from the physical environment, or a representation thereof, in addition to including computer-generated sensory inputs (e.g., virtual objects). On a virtuality continuum, a mixed reality environment is anywhere between, but not including, a wholly physical environment at one end and virtual reality environment at the other end.

In some MR environments, computer-generated sensory inputs may respond to changes in sensory inputs from the physical environment. Also, some electronic systems for presenting an MR environment may track location and/or orientation with respect to the physical environment to enable virtual objects to interact with real objects (that is, physical articles from the physical environment or representations thereof). For example, a system may account for movements so that a virtual tree appears stationery with respect to the physical ground.

Examples of mixed realities include augmented reality and augmented virtuality.

Augmented Reality

An augmented reality (AR) environment refers to a simulated environment in which one or more virtual objects are superimposed over a physical environment, or a representation thereof. For example, an electronic system for presenting an AR environment may have a transparent or translucent display through which a person may directly view the physical environment. The system may be configured to present virtual objects on the transparent or translucent display, so that a person, using the system, perceives the virtual objects superimposed over the physical environment. Alternatively, a system may have an opaque display and one or more imaging sensors that capture images or video of the physical environment, which are representations of the physical environment. The system composites the images or video with virtual objects, and presents the composition on the opaque display. A person, using the system, indirectly views the physical environment by way of the images or video of the physical environment, and perceives the virtual objects superimposed over the physical environment. As used herein, a video of the physical environment shown on an opaque display is called "pass-through video," meaning a system uses one or more image sensor(s) to capture images of the physical environment, and uses those images in presenting the AR environment on the opaque display. Further alternatively, a system may have a projection system that projects virtual objects into the physical environment, for example, as a hologram or on a physical surface, so that a person, using the system, perceives the virtual objects superimposed over the physical environment.

An augmented reality environment also refers to a simulated environment in which a representation of a physical environment is transformed by computer-generated sensory information. For example, in providing pass-through video, a system may transform one or more sensor images to impose a select perspective (e.g., viewpoint) different than the perspective captured by the imaging sensors. As another example, a representation of a physical environment may be transformed by graphically modifying (e.g., enlarging) portions thereof, such that the modified portion may be representative but not photorealistic versions of the originally captured images. As a further example, a representation of a physical environment may be transformed by graphically eliminating or obfuscating portions thereof.

Augmented Virtuality

An augmented virtuality (AV) environment refers to a simulated environment in which a virtual or computer generated environment incorporates one or more sensory inputs from the physical environment. The sensory inputs may be representations of one or more characteristics of the physical environment. For example, an AV park may have virtual trees and virtual buildings, but people with faces photorealistically reproduced from images taken of physical people. As another example, a virtual object may adopt a shape or color of a physical article imaged by one or more imaging sensors. As a further example, a virtual object may adopt shadows consistent with the position of the sun in the physical environment.

Hardware

There are many different types of electronic systems that enable a person to sense and/or interact with various CGR environments. Examples include head mounted systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head mounted system may have one or more speaker(s) and an integrated opaque display. Alternatively, a head mounted system may be configured to accept an external opaque display (e.g., a smartphone). The head mounted system may incorporate one or more imaging sensors to capture images or video of the physical environment, and/or one or more microphones to capture audio of the physical environment. Rather than an opaque display, a head mounted system may have a transparent or translucent display. The transparent or translucent display may have a medium through which light representative of images is directed to a person's eyes. The display may utilize digital light projection, OLEDs, LEDs, p LEDs, liquid crystal on silicon, laser scanning light source, or any combination of these technologies. The medium may be an optical waveguide, a hologram medium, an optical combiner, an optical reflector, or any combination thereof. In one embodiment, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface.

The foregoing is merely illustrative and various modifications can be made to the described embodiments. The foregoing embodiments may be implemented individually or in any combination.

What is claimed is:

1. An electronic device, comprising:
 a waveguide having an output coupler;
 a display configured to provide a display image to the waveguide that is coupled out of the waveguide towards an eye box by the output coupler;

a polarization-dependent lens through which a real-world image for a real-world object is viewable;

an electronic shutter, wherein the electronic shutter is configured to switch between a clear state in which the real-world image passes through the electronic shutter and an opaque state in which the real-world image is blocked by the electronic shutter; and a polarization switch between the output coupler and the polarization-dependent lens, wherein the polarization switch is configured to alternately switch between:

a first state when the electronic shutter is in the clear state, wherein in the first state the polarization switch is configured to allow the real-world image to pass through the polarization-dependent lens to the eye box without being focused by the polarization-dependent lens; and a second state when the electronic shutter is in the opaque state, wherein in the second state the polarization switch is configured to allow the display image to be focused by the polarization-dependent lens while passing to the eye box.

2. The electronic device defined in claim 1 wherein the real-world image has a first linear polarization upon reaching the polarization switch and wherein the display image has the first linear polarization upon reaching the polarization switch, and wherein the polarization switch is configured to:

pass the real-world image through the polarization switch with the first linear polarization when the polarization switch is in the first state; and pass the display image through the polarization switch while rotating the polarization of the display image from the first linear polarization to a second linear polarization that is orthogonal to the first linear polarization when the polarization switch is in the second state.

3. The electronic device defined in claim 2 wherein the polarization-dependent lens comprises a liquid crystal lens.

4. The electronic device defined in claim 2 wherein the polarization-dependent lens comprises a liquid crystal lens that is configured to focus light with the second linear polarization and is configured to not focus light with the first linear polarization.

5. The electronic device defined in claim 4 wherein the electronic shutter comprises an electrically adjustable liquid crystal layer.

6. The electronic device defined in claim 5 wherein the electronic shutter comprises first and second linear polarizers.

7. The electronic device defined in claim 6 wherein the electrically adjustable liquid crystal layer is between the first and second linear polarizers.

8. The electronic device defined in claim 7 wherein the output coupler is between the electrically adjustable liquid crystal layer and the second linear polarizer.

9. The electronic device defined in claim 7 wherein the second linear polarizer is between the electrically adjustable liquid crystal layer and the output coupler.

10. The electronic device defined in claim 1 wherein the polarization-dependent lens comprises a fixed birefringent lens that is not electrically adjustable.

11. The electronic device defined in claim 1 wherein the polarization-dependent lens comprises an electrically adjustable lens.

12. The electronic device defined in claim 1 further comprising a positive bias lens and a negative bias lens, wherein the electronic shutter, the output coupler, the polarization switch, and the polarization-dependent lens are between the positive bias lens and the negative bias lens.

13. A head-mounted device, comprising:
a display configured to output a display image;
a waveguide with an output coupler configured to pass the display image from the display to an eye box;
a polarization-dependent lens interposed between the output coupler and the eye box;
a first polarization switch between the polarization-dependent lens and the output coupler; and
an electrically adjustable shutter having first and second linear polarizers and a second polarization switch between the first and second linear polarizers, wherein the second polarization switch is switchable between a first state in which the electrically adjustable shutter blocks a real-world image from a real-world object from reaching the polarization-dependent lens and a second state in which the electrically adjustable shutter passes the real-world image to the polarization-dependent lens.

14. The head-mounted device defined in claim 13 wherein the first polarization switch is configured to switch between first and second states in corresponding synchronization with the first and second states of the second polarization switch.

15. The head-mounted device defined in claim 14 wherein the display is configured to turn off the display image when the second polarization switch is in the second state and is configured to turn on the display image when the second polarization switch is in the first state.

16. The head-mounted device defined in claim 15 wherein the display image reaches the first polarization switch with a first linear polarization when the second polarization switch is in the first state and wherein the first polarization switch is configured to rotate the first linear polarization of the display image to a second linear polarization that is orthogonal to the first linear polarization when the first polarization switch is in the first state.

17. The head-mounted device defined in claim 16 wherein the real-world image reaches the first polarization switch with the first linear polarization when the second polarization switch is in the second state and wherein the first polarization switch is configured to pass the real-world image of the first linear polarization without rotating the first linear polarization of the real-world image.

18. A head-mounted device, comprising:
a display;
switchable optical components configured to switch synchronously between a first state and a second state; and
a tunable liquid crystal lens through which a display image from the display is provided to an eye box during the first state and not the second state and through which a real-world image from a real-world object is provided to the eye box during the second state and not the first state, wherein the switchable optical components comprise a polarization switch through which the display image is provided to the eye box during the first state.

19. The head-mounted device defined in claim 18 wherein the switchable optical components comprise:
first and second linear polarizers; and
an additional polarization switch between the first and second linear polarizers, wherein the polarization switch is between the second linear polarizer and the tunable liquid crystal lens.

20. The head-mounted device defined in claim 19 further comprising:
a waveguide with an output coupler that is configured to pass the display image from the display to the polarization switch.

21. The head-mounted device defined in claim 18 wherein the tunable liquid crystal lens has an electrically adjustable lens center position.

22. An electronic device, comprising:
a display configured to provide a display image toward an eye box;
a polarization switch through which the display image is viewable from the eye box;
a polarization-dependent lens through which a real-world image is viewable from the eye box; and
an electronic shutter, wherein the electronic shutter is configured to switch between a first state in which the real-world image passes through the electronic shutter and a second state in which the real-world image is blocked by the electronic shutter.

23. The electronic device defined in claim 22, wherein the display is configured to provide the display image toward the eye box via an output coupler and wherein the polarization switch is between the output coupler and the polarization-dependent lens.

24. An electronic device, comprising:
a display configured to provide a display image;
a polarization switch through which the display image is viewable;
an electronic shutter that overlaps the polarization switch, wherein the electronic shutter comprises an additional polarization switch and wherein the polarization switch is configured to switch between first and second states in synchronization with first and second states of the additional polarization switch of the electronic shutter; and
a polarization-dependent lens that overlaps the polarization switch, wherein a real-world image is viewable through the electronic shutter and the polarization-dependent lens when the polarization switch is in the second state and the additional polarization switch is in the second state.

* * * * *